US009330507B2

(12) United States Patent
Alberry et al.

(10) Patent No.: US 9,330,507 B2
(45) Date of Patent: May 3, 2016

(54) SYSTEM AND METHOD FOR SELECTING INDIVIDUAL PARAMETERS TO TRANSITION FROM TEXT-TO-GRAPH OR GRAPH-TO-TEXT

(75) Inventors: Michel B. Alberry, San Jose, CA (US); Christopher J. Dewhurst, Cork (IE); Mike Matthews, Roscrea (IE)

(73) Assignee: Snap-On Incorporated, Kenosha, WI (US)

( * ) Notice: Subject to any disclaimer, the term of this patent is extended or adjusted under 35 U.S.C. 154(b) by 314 days.

(21) Appl. No.: 12/859,082

(22) Filed: Aug. 18, 2010

(65) Prior Publication Data

US 2012/0047458 A1 Feb. 23, 2012

(51) Int. Cl.
*G06F 3/048* (2013.01)
*G07C 5/08* (2006.01)
*G07C 5/00* (2006.01)

(52) U.S. Cl.
CPC .............. *G07C 5/0825* (2013.01); *G07C 5/008* (2013.01); *G07C 2205/02* (2013.01)

(58) Field of Classification Search
USPC .......................................................... 715/786
See application file for complete search history.

(56) References Cited

U.S. PATENT DOCUMENTS 4,113,980 A 9/1978 Bell
4,270,174 A 5/1981 Karlin et al.
4,404,639 A 9/1983 McGuire et al.
4,441,359 A 4/1984 Ezoe
4,602,127 A 7/1986 Neely et al.
4,853,850 A 8/1989 Krass, Jr. et al.
4,962,456 A 10/1990 Abe et al.
5,157,610 A 10/1992 Asano et al.
5,160,892 A 11/1992 Makhija et al.
5,365,436 A 11/1994 Schaller et al.
5,373,458 A 12/1994 Bishay et al.
5,432,904 A 7/1995 Wong
5,442,553 A 8/1995 Parrillo
5,465,207 A 11/1995 Boatwright et al.
5,506,772 A 4/1996 Kubozono et al.
5,521,443 A 5/1996 Imura et al.
5,532,927 A 7/1996 Pink et al.
5,541,840 A 7/1996 Gurne et al.
5,553,235 A * 9/1996 Chen .................. G06F 11/2294 714/20
5,583,912 A 12/1996 Schillaci et al.
5,592,383 A 1/1997 Rogers et al.
5,758,300 A 5/1998 Abe
5,766,020 A 6/1998 Hughes
5,850,209 A 12/1998 Lemke et al.
5,884,202 A 3/1999 Arjomand
5,899,947 A 5/1999 Hall et al.
6,021,366 A 2/2000 Fieramosca et al.
6,055,468 A 4/2000 Kaman et al.
6,067,486 A 5/2000 Aragones et al.
6,094,609 A 7/2000 Arjomand
6,134,489 A 10/2000 Smedley
6,169,943 B1 1/2001 Simon et al.
6,178,527 B1 1/2001 Vidales
6,179,214 B1 1/2001 Key et al.
6,181,563 B1 1/2001 Shimbo et al.
6,188,384 B1 2/2001 Sullivan et al.
6,192,303 B1 2/2001 Takakura et al.
6,294,982 B1 9/2001 Hooks et al.
6,314,422 B1 11/2001 Barker et al.
6,321,151 B1 11/2001 Shultz
6,348,935 B1 * 2/2002 Malacinski ........... G06F 3/0481 715/840
6,356,823 B1 3/2002 Iannotti et al.
6,360,551 B1 3/2002 Renders
6,374,315 B1 4/2002 Okada et al.
6,385,300 B1 5/2002 Mohammadian et al.
6,401,049 B1 6/2002 Ehmer
6,477,478 B1 11/2002 Jones et al.
6,487,478 B1 11/2002 Azzaro et al.
6,609,050 B2 8/2003 Li
6,622,070 B1 9/2003 Wacker et al.

(Continued)

FOREIGN PATENT DOCUMENTS

GB 2385934 A 9/2003
WO 9956201 A1 11/1999

(Continued)

OTHER PUBLICATIONS

YouTube Gets Theater View for Long Videos http://lifehacker.com/5060101/youtube-gets-theater-view-for-long-videos, Oct. 7, 2008. 1page.*
YouTube Threater View, http://blogoscoped.com/forum/142450.html, Oct. 6, 2008, 2 pages.*
Fluke Corporation, Digital Multimeters, downloaded from the World Wide Web at http://us.fluke.com/usen/products/categorydmm on Jan. 28, 2010.
Fluke Corportation, 233 True=rms Remote Display Digital Multimeter Users Manual, Sep. 2009.
Shigeru et al, DL7100 Signal Explorer, A High-Speed Digital Oscilloscope with Long Record Length, Yokogawa Electric Corporation, Yogogawa Technical Report English Edition, No. 30, (2000).
bluetomorrow.com, Bluetooth Pairing, downloaded from the World Wide Web at www.bluetomorrow.com on Apr. 30, 2010.
Snap-On Diagnostics, Snap-on Introduces Verdict Diagnostic and Information System, Aug. 24, 2010.
Testpath, Inc., Fluke Meter Holsters, downloaded from the World Wide Web at http://www.testpath.com/Categories/Fluke-Meter-Holsters-2220.htm on May 6, 2010.

(Continued)

*Primary Examiner* — Ajay Bhatia
*Assistant Examiner* — Haimei Jiang
(74) *Attorney, Agent, or Firm* — McDermott Will Emery LLC

(57) ABSTRACT

A system and method for selecting individual parameters to transform from text-to-graph and graph-to-text is disclosed. The system includes a display device having a display screen for showing multiple views, including a non-graph view and a graph view. The non-graph view includes a plurality of demarcated portions, each having a graph selection element, a parameter identifier that corresponds to the graph selection element, and a current parameter value that corresponds to the graph selection element. The graph selection element may be selected to show a graph view. The graph view includes a first parameter identifier and a first current parameter value each corresponding to the selected graph selection element, a text selection element, and a graph of multiple parameter values associated with the first parameter identifier. Upon selection of the text selection element, the screen returns to the non-graph view.

20 Claims, 6 Drawing Sheets

(56) References Cited

U.S. PATENT DOCUMENTS

| | | | |
|---|---|---|---|
| 6,640,166 | B2 | 10/2003 | Liebl et al. |
| 6,662,123 | B2 | 12/2003 | Maeckel et al. |
| 6,693,367 | B1 | 2/2004 | Schmeisser et al. |
| 6,711,524 | B2 | 3/2004 | Wolf et al. |
| 6,745,151 | B2 | 6/2004 | Marko et al. |
| 6,757,521 | B1 | 6/2004 | Ying |
| 6,778,931 | B1 | 8/2004 | Letts et al. |
| 6,789,007 | B2 | 9/2004 | Ellis et al. |
| 6,802,032 | B1 | 10/2004 | Budinger et al. |
| 6,807,469 | B2 | 10/2004 | Funkhouser et al. |
| 6,822,639 | B1 | 11/2004 | Silverbrook et al. |
| 6,823,243 | B2 | 11/2004 | Chinnadurai et al. |
| 6,844,823 | B2 | 1/2005 | Hooks et al. |
| 6,847,916 | B1 | 1/2005 | Ying |
| 6,873,940 | B1 | 3/2005 | Kamatani |
| 6,947,043 | B1 | 9/2005 | Klingman et al. |
| 6,957,128 | B1 | 10/2005 | Ito et al. |
| 6,959,235 | B1 | 10/2005 | Abdel-Malek et al. |
| 6,972,669 | B2 | 12/2005 | Saito et al. |
| 6,982,653 | B2 | 1/2006 | Voeller et al. |
| 6,988,053 | B2 | 1/2006 | Namaky |
| 7,020,546 | B2 | 3/2006 | Nagai et al. |
| 7,023,332 | B2 | 4/2006 | Saito et al. |
| 7,073,714 | B2 | 7/2006 | Namaky et al. |
| 7,124,058 | B2 | 10/2006 | Namaky et al. |
| 7,155,321 | B2 | 12/2006 | Bromley et al. |
| 7,200,483 | B1 | 4/2007 | Kavadeles |
| 7,216,116 | B1 * | 5/2007 | Nilsson ............. G06F 17/30398 |
| 7,224,262 | B2 | 5/2007 | Simon et al. |
| 7,251,552 | B2 | 7/2007 | Schmeisser et al. |
| 7,254,550 | B2 | 8/2007 | Reichwein et al. |
| 7,269,482 | B1 | 9/2007 | Shultz et al. |
| 7,272,476 | B2 | 9/2007 | Ortiz et al. |
| 7,281,663 | B2 | 10/2007 | Schmidt et al. |
| 7,294,906 | B2 | 11/2007 | Ukaji |
| 7,327,228 | B2 | 2/2008 | Min et al. |
| 7,336,082 | B1 | 2/2008 | Mofield |
| 7,383,318 | B2 | 6/2008 | Craik |
| 7,444,216 | B2 | 10/2008 | Rogers et al. |
| 7,504,926 | B2 | 3/2009 | Bessho et al. |
| 7,505,038 | B2 * | 3/2009 | Bell ........................ G06T 11/20 345/419 |
| 7,580,781 | B2 * | 8/2009 | Mindeman ......... G05B 23/0267 340/438 |
| 7,613,554 | B2 | 11/2009 | Rollinger et al. |
| 7,634,337 | B2 | 12/2009 | Brozovich et al. |
| 7,648,062 | B2 | 1/2010 | Corniot |
| 7,702,437 | B2 | 4/2010 | Gilbert |
| 7,711,462 | B2 | 5/2010 | Daniels et al. |
| 7,751,955 | B2 | 7/2010 | Chinnadurai et al. |
| 2001/0001850 | A1 | 5/2001 | Miller |
| 2002/0077780 | A1 * | 6/2002 | Liebl .................... G01R 31/319 702/183 |
| 2002/0174416 | A1 * | 11/2002 | Bates .................. G06F 11/3636 717/128 |
| 2003/0020759 | A1 | 1/2003 | Cancilla et al. |
| 2004/0172177 | A1 * | 9/2004 | Nagai .................... G07C 5/085 701/33.4 |
| 2005/0083965 | A1 | 4/2005 | Sodergren |
| 2005/0144069 | A1 * | 6/2005 | Wiseman ............... G06Q 30/02 705/14.41 |
| 2005/0152294 | A1 | 7/2005 | Yu et al. |
| 2005/0157732 | A1 | 7/2005 | Joy et al. |
| 2005/0182537 | A1 | 8/2005 | Tefft et al. |
| 2005/0267655 | A1 | 12/2005 | Gessner |
| 2006/0025897 | A1 | 2/2006 | Shostak et al. |
| 2006/0078175 | A1 | 4/2006 | Brozovich |
| 2006/0101311 | A1 | 5/2006 | Lipscomb et al. |
| 2006/0106508 | A1 | 5/2006 | Liebl et al. |
| 2006/0149434 | A1 | 7/2006 | Bertosa et al. |
| 2006/0180371 | A1 | 8/2006 | Breed et al. |
| 2006/0212239 | A1 | 9/2006 | Letts et al. |
| 2006/0212540 | A1 | 9/2006 | Chon et al. |
| 2006/0226298 | A1 | 10/2006 | Pierson |
| 2007/0083307 | A1 | 4/2007 | Pasztor et al. |
| 2007/0100520 | A1 * | 5/2007 | Shah ...................... G07C 5/008 701/31.4 |
| 2007/0156311 | A1 | 7/2007 | Elcock et al. |
| 2007/0200550 | A1 | 8/2007 | Corredoura |
| 2007/0244611 | A1 | 10/2007 | Brozovich |
| 2007/0244614 | A1 | 10/2007 | Nathanson |
| 2007/0244990 | A1 * | 10/2007 | Wells ................ G06F 17/30896 709/218 |
| 2007/0288134 | A1 | 12/2007 | Rollinger et al. |
| 2007/0290847 | A1 | 12/2007 | Harrington et al. |
| 2007/0294556 | A1 | 12/2007 | Wutka |
| 2008/0033609 | A1 | 2/2008 | Razavi |
| 2008/0070501 | A1 | 3/2008 | Wyld |
| 2008/0082278 | A1 | 4/2008 | Tan et al. |
| 2008/0122288 | A1 | 5/2008 | Plante et al. |
| 2008/0125067 | A1 | 5/2008 | Bells et al. |
| 2008/0140281 | A1 | 6/2008 | Morris et al. |
| 2008/0295014 | A1 * | 11/2008 | Hennum ............. G06F 3/04842 715/771 |
| 2009/0125351 | A1 | 5/2009 | Davis, Jr. |
| 2009/0265057 | A1 | 10/2009 | Chinnadurai et al. |
| 2009/0276115 | A1 | 11/2009 | Chen |
| 2009/0288009 | A1 * | 11/2009 | Dulaney .............. G06F 3/04817 715/719 |
| 2009/0299539 | A1 | 12/2009 | Chinnadurai et al. |
| 2009/0307188 | A1 * | 12/2009 | Oldham ................ G06F 3/0482 |
| 2010/0076644 | A1 | 3/2010 | Cahill et al. |
| 2011/0069769 | A1 * | 3/2011 | Stennicke ............... H04L 12/58 375/259 |
| 2011/0141953 | A1 | 6/2011 | Wright et al. |
| 2012/0010765 | A1 * | 1/2012 | Wilson ................. G08G 5/0021 701/3 |
| 2012/0089893 | A1 * | 4/2012 | Bousamra .......... A61B 5/14532 714/807 |
| 2012/0255160 | A1 * | 10/2012 | Boone .................. A61B 5/1038 29/592 |

FOREIGN PATENT DOCUMENTS

| | | | |
|---|---|---|---|
| WO | 00/34838 | | 6/2000 |
| WO | 0155690 | A1 | 8/2001 |
| WO | 0167420 | A1 | 9/2001 |
| WO | 0186576 | A1 | 11/2001 |
| WO | 2006/050454 | | 5/2006 |
| WO | 2006110786 | A2 | 10/2006 |
| WO | 2007038983 | A1 | 4/2007 |
| WO | 2009149007 | A1 | 12/2009 |
| WO | 2010019771 | A1 | 2/2010 |

OTHER PUBLICATIONS

BMW Canada, Bluetooth Pairing Instructions, Sep. 2009.

Accessory Geeks, Bluetooth Pairing Guides, downloaded from the World Wide Web at http://www.accessorygeeks.com/bluetooth-pairing-guide1.html on Apr. 30, 2010.

Quatech, Inc., Bluetooth Communication Overview, downloaded from the World Wide Web at http://www.quatech.com/support/comm-over-bluetooth.php on May 3, 2010.

Omitec Limited, T4 Diagnostic System, downloaded from the World Wide Web at http://web.archive.org/web/20091119041838/http://www.omitec.com/us/products/diagnostic-testers/t4-diagnostic-system/ as archived on Nov. 19, 2009.

Omitec Limited, Workstations, downloaded from the World Wide Web at http://web.archive.org/web/20100322213801/http://www.omitec.com/us/products/workstation/ as archived on Mar. 22, 2010.

anotherurl.com, Bluetooth, What is Bluetooth? downloaded from the World Wide Web at http://www.anotherurl.com/library/bluetooth_research.htm on May 17, 2010.verdict.

Snap-On Incorporated, EEDM604C, Multimeter, Digital, Automotive, True RMS, Auto Ranging, Hybrid Vehicles, downloaded from the World Wide Web at http://buy1.snapon.com/catalog/item.asp?store=snapon-store&item__ID=88136&group__ID=1367 on May 4, 2010.

Snap-On Incorporated, EEDM596DK, Multimeter, Digital, Advanced, Manual Ranging, downloaded from the World Wide Web at http://buy1.snapon.com/catalog/item.asp?store=snapon-store&item__ID=84657&group__ID=1367 on May 4, 2010.

(56) References Cited

OTHER PUBLICATIONS

Snap-On Incorporated, EEDM503D, Multimeter, Digital, Automotive, True RMS, downloaded from the World Wide Web at http://buy1.snapon.com/catalog/item.asp?store=snapon-store&item_ID=84656&group_ID=1367 on May 4, 2010.
Fluke, 163/164 MultiFunction Counter Users Manual, Feb. 1, 1997.
Fluke, Fluke 164 2.7 GHz Multifunction Counter Technical Data, May 10, 2007.
Flores, J., Wireless Diagnostics and Consultancy Services, Vital Engineering, Jan. 4, 2007.
Fluke, Fluke 199B / 003 Scopemeter 200 MHz, Dual Portable Multimeter and Oscilloscope, downloaded from the World Wide Web at http://web.archive.org/web/20100413065253/http://www.fluke199.com/ as archived on Apr. 12, 2010.
Fluke Corporation, ScopeMeter 120 and 190 Series incl. 225C and 215C, Technical Data, Jan. 2010.
Fluke Corporation, Fluke 19xC-2x5C Scopemeter, Software version 8.00 onwards, Users Manual, Jul. 2008.
Jones, Mike, Senior FAE, Micrel Inc., Ethernet Driving Down Automotive Cost of Ownership; Oct. 31, 2008.
U.S. Appl. No. 12/859,040, filed Aug. 18, 2010.
U.S. Appl. No. 13/198,426, filed Aug. 4, 2011.
U.S. Appl. No. 12/859,077, filed Aug. 18, 2010.
U.S. Appl. No. 12/858,699, filed Aug. 18, 2010.
U.S. Appl. No. 12/859,051, filed Aug. 18, 2010.
U.S. Appl. No. 13/189,940, filed Jul. 25, 2011.
U.S. Appl. No. 13/205,318, filed Aug. 8, 2011.
U.S. Appl. No. 13/198,974, filed Aug. 5, 2011.
U.S. Appl. No. 12/913,249, filed Oct. 27, 2010.
U.S. Appl. No. 12/913,184, filed Oct. 27, 2010.
U.S. Appl. No. 12/859,011, filed Aug. 18, 2010.
U.S. Appl. No. 13/198,530, filed Aug. 4, 2011.
U.S. Appl. No. 12/858,725, filed Aug. 18, 2010.
Zussman, Gil et al. "Bluetooth Time Division Duplex-Analysis as a Polling System." Obtained from World Wide Web at http://web.archive.org/web/20041230040105/http://www.mit.edu/~gilz/pub_files/secon4.pdf available on Dec. 30, 2004.
"OBDII Automotive Scan Tool and Virtual Dashboard." OBD-2 Vehicle Explorer Scan Tool Browser. Obtained from World Wide Web at http://web.archive.org/web/20100723052216/http://obd-2.com/ available on Jul. 23, 2010.
"Nology, PDA-Dyno and OBD II Scan Tool, Operating Manual." Nology Engineering, Inc. Obtained from World Wide Web at http://web.archive.org/web/20100927062436/http://nology.com/pdfandzipfiles/pdadynousermanual.pdf available on Sep. 27, 2010.
Metzelaar, R.H.M. "Peugeot 205 holding back." Automotive Oscilloscope Applications—TiePie engineering 1996, 2010.
Report Lab, OBD-II PIDs. Obtained from the World Wide Web at http://web.archive.org/web/20100329141311/http://en.wikipedia.org/wiki/OBD-II_PIDs available on Mar. 29, 2010.
Bluetooth Architecture—Data Transport. Bluetooth Sig, Inc. Downloaded from the World Wide Web at http://developer.bluetooth.org/KnowledgeCenter/TechnologyOverview/Pages/DataTransport.aspx Accessed on Nov. 21, 2012.

* cited by examiner

SYSTEM AND METHOD FOR SELECTING INDIVIDUAL PARAMETERS TO TRANSITION FROM TEXT-TO-GRAPH OR GRAPH-TO-TEXT

BACKGROUND

Vehicles, such as automobiles, light-duty trucks, and heavy-duty trucks, play an important role in the lives of many people. To keep vehicles operational, some of those people rely on vehicle technicians to diagnose and repair their vehicle.

Vehicle technicians use a variety of tools in order to diagnose and/or repair vehicles. Those tools may include common hand tools, such as wrenches, hammers, pliers, screwdrivers and socket sets, or more vehicle-specific tools, such as cylinder hones, piston ring compressors, and vehicle brake tools. The tools used by vehicle technicians may also include electronic diagnostic tools such as a digital voltage-ohm meter (DVOM) or a vehicle scan tool that communicates with an electronic control unit (ECU) within a vehicle.

A number of different types of diagnostic tools have been used, such as engine analyzers, which are designed to monitor a variety of operating conditions of an internal combustion engine, and scanners for downloading data from vehicle on-board computers, such as the ECU. In addition, diagnostic tools may include laboratory-type tools like oscilloscopes, digital volt-ohm meters (DVOM) and the like.

Electronic diagnostic tools include displays for providing the desired information to a technician. These displays are often interactive so the technician can easily retrieve whatever information is needed. However, current tools have operating systems that require multiple steps to retrieve certain specific information regarding the vehicle.

By providing the repair technician with detailed information for quickly diagnosing and repairing vehicles, vehicle repair times can be decreased, vehicle turn-over is increased, and as a result, repair technicians may reap increased profits from a same amount of garage space.

OVERVIEW

In one embodiment, a diagnostic tool for displaying data is described. The diagnostic tool includes a display having a non-graph view including a plurality of demarcated portions. Each of the plurality of demarcated portions includes a graph selection element, a parameter identifier that corresponds to the graph selection element, and a current parameter value that corresponds to the graph selection element. The display also includes a graph view upon selection of the graph selection element in one of the demarcated portions. The graph view includes a first parameter identifier and a first current parameter value, each corresponding to the selected graph selection element. The graph view also includes a text selection element and a graph of parameter values associated with the first parameter identifier. In the graph view, some of the demarcated portions may be viewable within the display, and the demarcated portions which are not shown in the display are viewable using a scrollbar.

In another embodiment, the diagnostic tool includes a display having a non-graph view including a plurality of demarcated portions. Each of the plurality of demarcated portions includes a graph selection element, a parameter identifier that corresponds to the graph selection element, and a current parameter value that corresponds to the graph selection element. The display also includes a graph view upon selection of the graph selection element in one of the demarcated portions. The graph view includes a first parameter identifier and a first current parameter value each corresponding to the selected graph selection element. The graph view also includes a text selection element and a graph of parameter values associated with the first parameter identifier. Upon the selection of the text selection element, the display returns to the non-graph view.

In yet another embodiment, a method for displaying data on a diagnostic tool having a display is disclosed. The method includes providing, in the display, a non-graph view having a plurality of demarcated portions. Each of the plurality of demarcated portions includes a graph selection element, a parameter identifier that corresponds to the graph selection element, and a current parameter value that corresponds to the graph selection element. Next, a graph selection element in one of the demarcated portions is selected to show a graph view in the display. The graph view includes a first parameter identifier and a first current parameter value, each corresponding to the selected graph selection element. The graph view also includes a text selection element and a graph of parameter values associated with the first parameter identifier. Upon selection of the text selection element, the display returns to the non-graph view.

These as well as other aspects and advantages will become apparent to those of ordinary skill in the art by reading the following detailed description, with reference where appropriate to the accompanying drawings. Further, it should be understood that the embodiments described in this overview and elsewhere are intended to be examples only and do not necessarily limit the scope of the claims.

BRIEF DESCRIPTION OF THE DRAWINGS

Example embodiments are described herein with reference to the drawings, in which.

DETAILED DESCRIPTION

This description sets forth systems comprising multiple devices for use in servicing (e.g., diagnosing and/or repairing) a device-under-service. Each device of a described system is operable independently (e.g., as a stand-alone device) as well as in combination with other devices of the system. Each device of a described system may alternatively be referred to as an apparatus.

Each device of a described system is operable to carry out functions for servicing a device-under-service. The device-under-service may comprise a vehicle, a refrigeration unit, a personal computer, or some other serviceable device. Additionally or alternatively, the device-under-service may comprise a system such as a heating, ventilation, and air conditioning (HVAC) system, a security system, a computer system (e.g., a network), or some other serviceable system.

The functions for servicing the device-under-service may include but are not limited to diagnostic functions, measurement functions, and scanning functions.

To work in combination with each other, the device of a described system is operable to communicate with another device via a communications network. The communications network may comprise a wireless network, a wired network, or both a wireless network and a wired network. Data obtained by a device from a device-under-service or data otherwise contained in that device may be transmitted to another device via the communications network between those devices.

Figure 1:
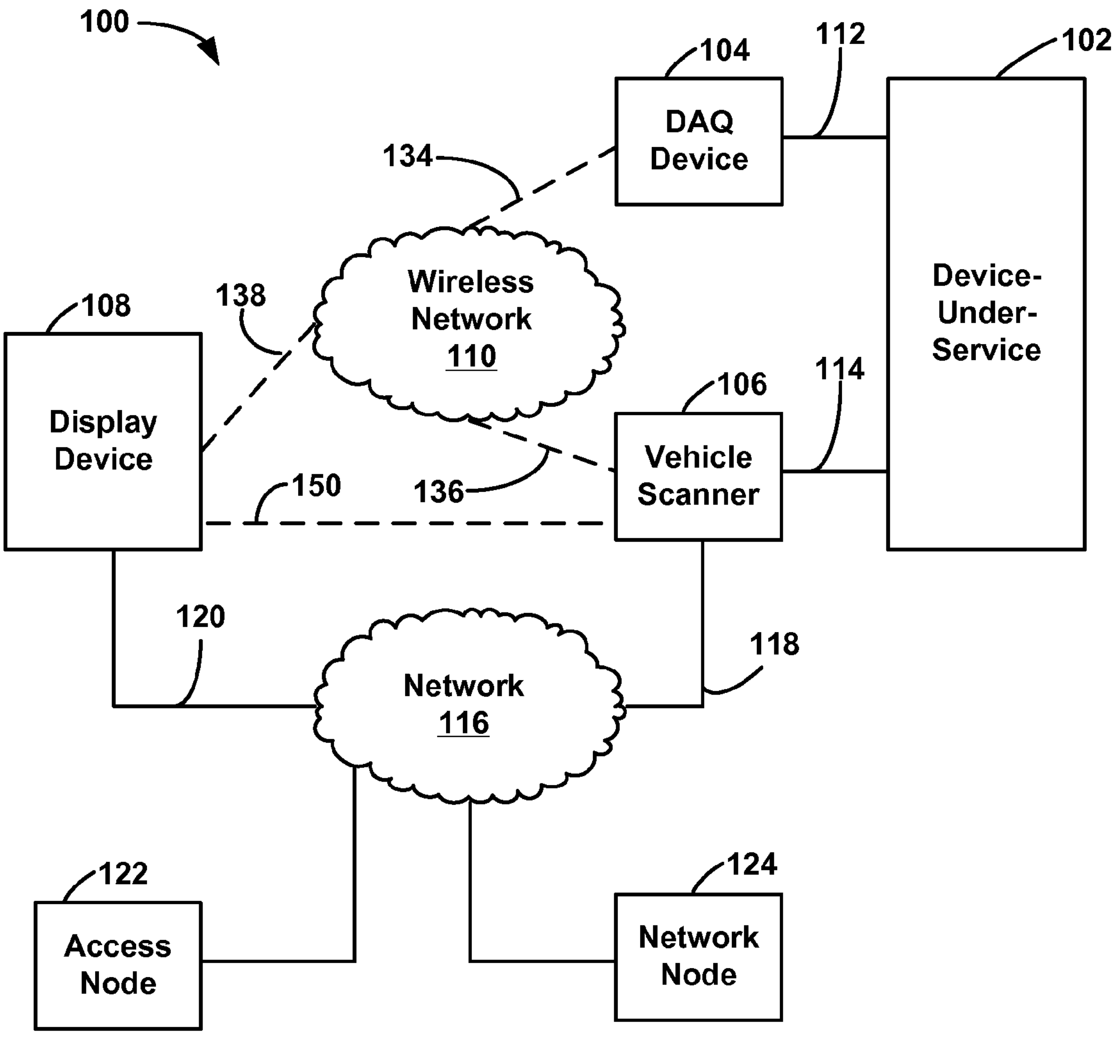
FIG. 1 is a block diagram of a system in accordance with an example embodiment.

FIG. 1 is a block diagram of a system 100 in accordance with an example embodiment. System 100 comprises a device-under-service 102, a data acquisition device (DAQ) device 104, a vehicle scanner 106, and a display device 108. Display device 108 may be referred to as a controller device since display device 108 may operate as a master of DAQ device 104 and/or vehicle scanner 106 when those devices are operating as a slave device or slave scanner, respectively.

Devices shown in the Figures and described in this specification are also described in U.S. patent application Ser. No. 61/374,723, filed on Aug. 18, 2010, entitled "Method and Apparatus to Use Remote and Local Control Modes to Acquire and Visually Present Data", which is incorporated by reference herein in its entirety.

The block diagram of FIG. 1 and other block diagrams and flow charts accompanying this description are provided merely as examples and are not intended to be limiting. Many of the elements illustrated in the figures and/or described herein are functional elements that may be implemented as discrete or distributed components or in conjunction with other components, and in any suitable combination and location. Those skilled in the art will appreciate that other arrangements and elements (for example, machines, interfaces, functions, orders, and groupings of functions, etc.) can be used instead. Furthermore, various functions described as being performed by one or more elements can be carried out by a processor executing computer-readable program instructions and/or by any combination of hardware, firmware, and software.

A wireless network 110 may be established between any two or more of devices 104, 106, and 108. Any one of those devices may join (e.g., begin communicating via) wireless network 110 after wireless network 110 is established. As an example, FIG. 1 shows wireless network 110 connected to: DAQ device 104 via wireless link 134, vehicle scanner 106 connected via wireless link 136, and display device 108 via wireless link 138. In some embodiments, a wireless link includes a point-to-point wireless connection between two devices, such as wireless link 150 between vehicle scanner 106 and display device 108. Devices 104, 106, and 108 are operable to carry out communications with each other via wireless network 110. Other devices, such as a personal digital assistant (PDA) may be operable to join wireless network 110 as another remote device so as to communicate with other devices communicating via wireless network 110.

Wireless network 110 may comprise one or more wireless networks. Each of the one or more wireless networks may be arranged to carry out communications according to a respective air interface protocol. Each air interface protocol may be arranged according to an industry standard, such as an Institute of Electrical and Electronics Engineers (IEEE) 802 standard. The IEEE 802 standard may comprise an IEEE 802.11 standard for Wireless Local Area Networks (e.g., IEEE 802.11 a, b, g, or n), an IEEE 802.15 standard for Wireless Personal Area Networks, an IEEE 802.15.1 standard for Wireless Personal Area Networks—Task Group 1, an IEEE 802.16 standard for Broadband Wireless Metropolitan Area Networks, or some other IEEE 802 standard. For purposes of this description, a wireless network arranged to carry out communications according to the IEEE 802.11 standard is referred to as a Wi-Fi network, and a wireless network arranged to carry out communications according to the IEEE 802.15.1 is referred to as a Bluetooth network.

DAQ device 104 may connect to device-under-service 102 via wired link 112. Wired link 112 may comprise input leads, for example. DAQ device 104 may comprise a digital volt meter (DVM), a digital volt ohm meter (DVOM), an oscilloscope, or some other type of measurement device operational to acquire data from device-under-service 102.

Vehicle scanner 106 may connect to device-under-service 102 via wired link 114. Wired link 114 may be arranged as a cable assembly described in U.S. patent application Ser. No. 61/374,805, filed on Aug. 18, 2010, and is entitled "Cable assembly for protection against undesired signals," which is incorporated herein by reference, or wired link 114 may be arranged as some other wired link. Vehicle scanner 106 may comprise a device that is operable to request and/or monitor data from one or more electronic control units (ECU) located on and/or within device-under-service 102. The data from the ECU(s) may comprise serial data arranged according to serial data available at an On Board Diagnostic (OBD) II connector within an automobile, such as a Society of Automotive Engineers (SAE) J1850 standard or an International Organization for Standardization (ISO) 9141-2 standard.

Vehicle scanner 106 may be operable as a stand-alone-device when vehicle scanner 106 operates as a data recorder to collect data from device-under-service 102 and other devices of system 100 are not connected to device-under-service 102 or communicating with vehicle scanner 106. Such data obtained when vehicle scanner operates as a data recorder can subsequently be displayed via another device of system 100, such as display device 108.

Device-under-service 102 may comprise a vehicle, such as an automobile, a motorcycle, a semi-tractor, a light-duty truck, a medium-duty truck, a heavy-duty truck, farm machinery, or some other vehicle. System 100 is operable to carry out a variety of functions, including functions for servicing device-under-service 102. The example embodiments may include or be utilized with any appropriate voltage or current source, such as a battery, an alternator, a fuel cell, and the like, providing any appropriate current and/or voltage, such as about 12 volts, about 42 volts, and the like. The example embodiments may be used with any desired system or engine. Those systems or engines may comprise items utilizing fossil fuels, such as gasoline, natural gas, propane, and the like, electricity, such as that generated by battery, magneto, fuel cell, solar cell and the like, wind and hybrids or combinations thereof. Those systems or engines may be incorporated into other systems, such as an automobile, a truck, a boat or ship, a motorcycle, a generator, an airplane and the like.

One or more of remote devices 104 and 106 and display device 108 may connect to a wired network 116. Vehicle scanner 106 and display device 108 may connect to a network 116 via wired links 118 and 120, respectively. Network 116 may include and/or connect to the Internet, and network 116 may include and/or connect to one or more network nodes, such as an access node 122 and a network node 124. Access node 122 may provide any of DAQ device 104, vehicle scanner 106, and display device 108 with wireless connectivity to network 116. Network node 124 may comprise a desktop personal computer (PC), a workstation that executes a Unixbased or Linux-based operating system, or some other node that interfaces and/or connects to network 116. In accordance with an example in which device-under-service 102 comprises an automobile, network node 124 may comprise a desktop PC or workstation operating at an automobile repair facility. In that regard, network node 124 may operate as a server that provides data (e.g., automobile repair data and/or instruction data) to display device 108.

Figure 2:
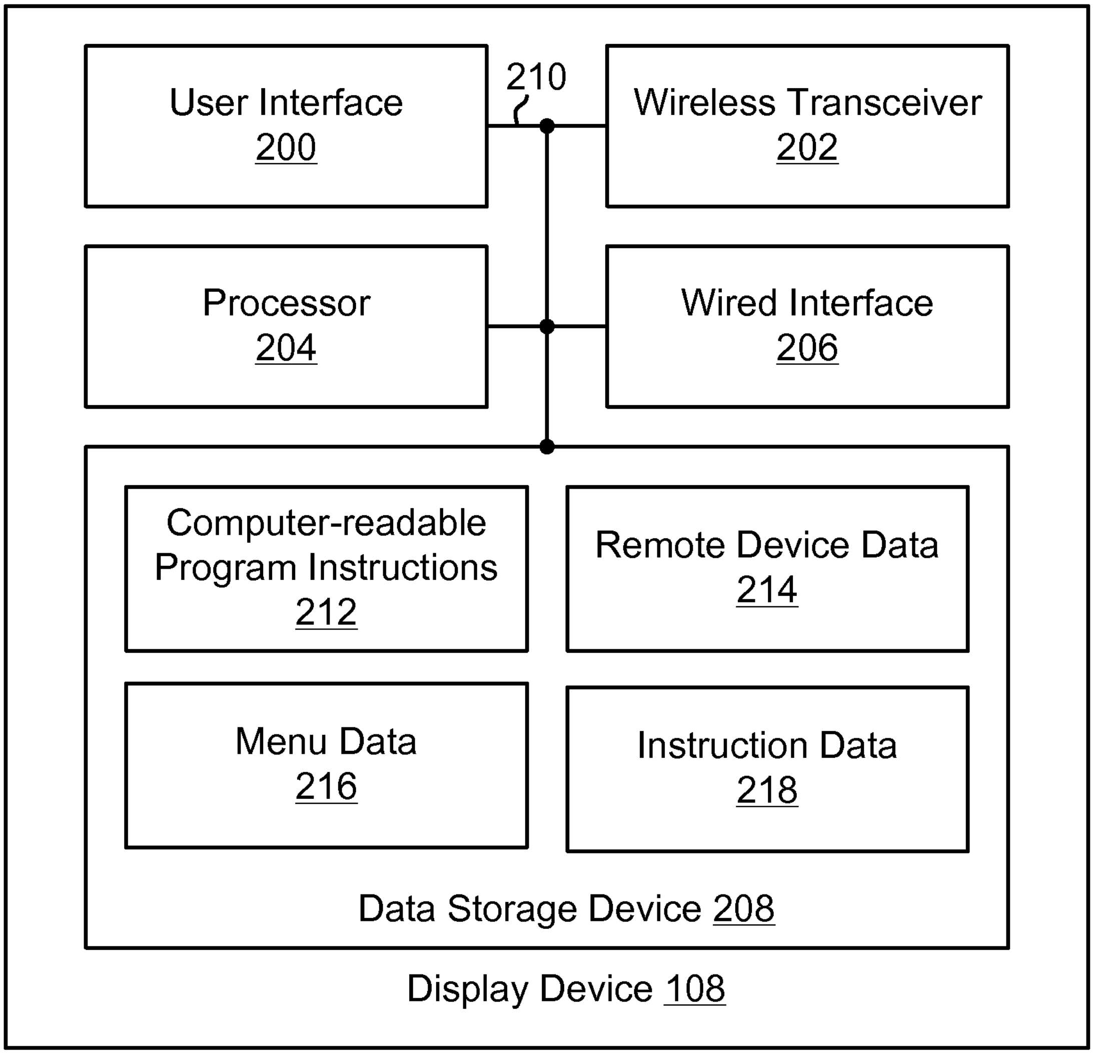
FIG. 2 is a block diagram of an example display device.

DAQ device 104 and remote device 106 may each transmit data to display device 108 for display via a user interface 200 (shown in FIG. 2). For example, DAQ device 104 may transmit data to display device 108 via the Bluetooth network of wireless network 110 and remote device 106 may transmit data to display device 108 via the Wi-Fi network of wireless network 110. Alternatively, DAQ device 104 and vehicle scanner 106 may take turns transmitting data to display device 108 via the Bluetooth network, the Wi-Fi network, or both the Bluetooth network and the Wi-Fi network.

Figure 3:
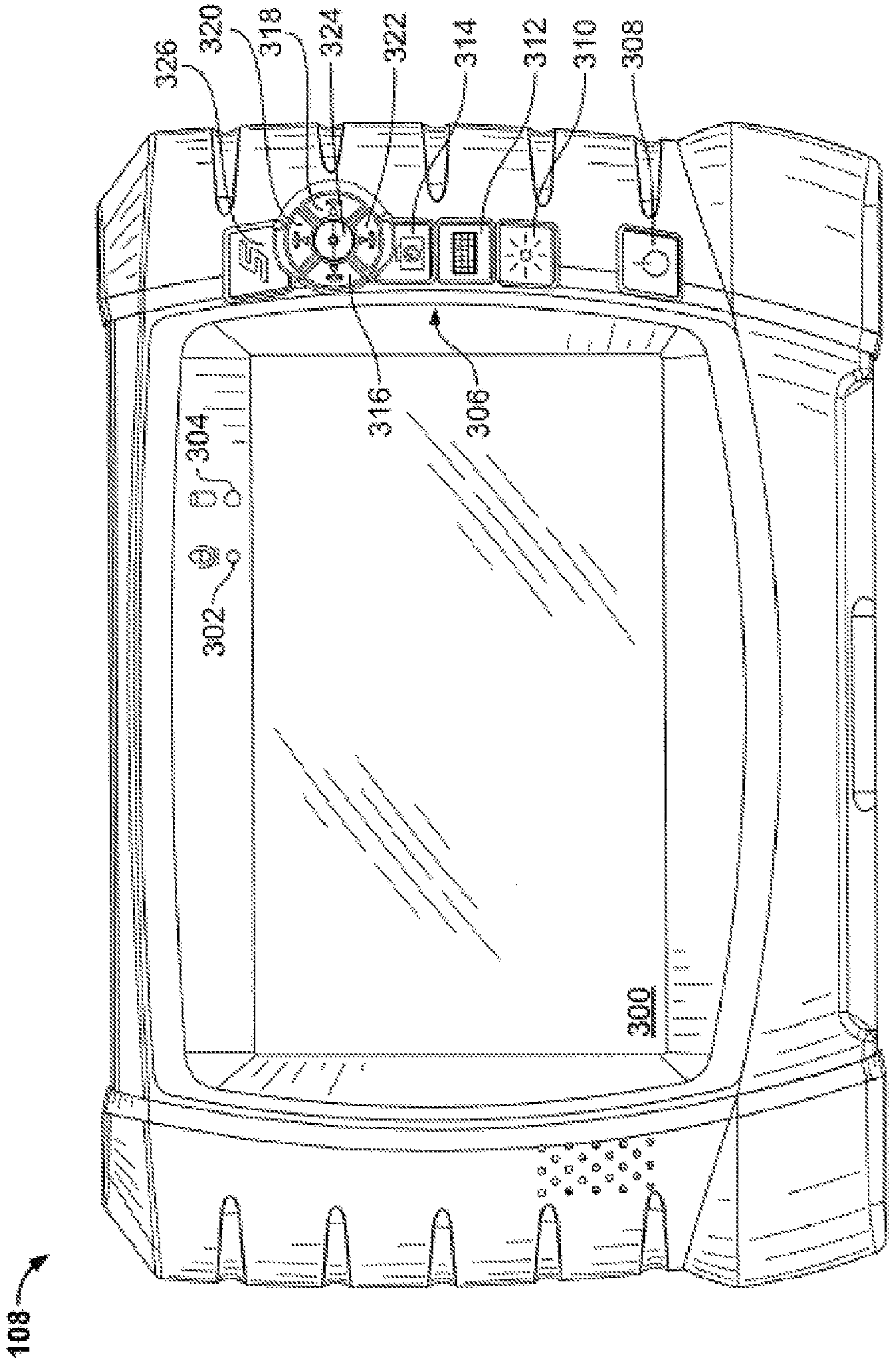
FIG. 3 is a front view of an example embodiment of the display device of FIG. 2.

Next, FIG. 2 is a block diagram of display device 108, and FIG. 3 illustrates details of an example embodiment of display device 108. As illustrated in FIG. 2, display device 108 includes a user interface 200, a wireless transceiver 202, a processor 204, a wired interface 206, and a data storage device 208, all of which may be linked together via a system bus, network, or other connection mechanism 210.

User interface 200 is operable to present data to a user and to enter user inputs (e.g., user selections). User interface 200 may include a display, such as display 300 illustrated in FIG. 3. Display 300 is operable to visually present data, such as data transmitted to wireless transceiver 202 from a remote device (e.g., DAQ device 104 or vehicle scanner 106), data that is transmitted to wired interface 206, data stored at data storage device 208 (e.g., menu data 216), or some other type of data. Display 300 may simultaneously display data that is transmitted to display device 108 from DAQ device 104 and data that is transmitted to display device 108 from vehicle scanner 106. User interface 200 may include a selection element that is operable to enter a user selection. Examples of the selection element are illustrated in FIG. 3 and include, but are not limited to, keyboards, microphones, touch-screens, switches, buttons, computer mice, joysticks, and some other types of selection elements.

Wireless transceiver 202 comprises a wireless transceiver that is operable to carry out communications via wireless network 110. Wireless transceiver 202 may carry out communications with one or more remote devices, such as one or more of DAQ device 104, vehicle scanner 106, and some other device (other than display device 108) that is operating to communicate via wireless network 110. As an example, wireless transceiver 202 may comprise a transceiver that is operable to carry out communications via a Bluetooth network. For purposes of this description, a transceiver that is operable to carry out communications via a Bluetooth network is referred to as a Bluetooth transceiver. As another example, wireless transceiver 202 may comprise a transceiver that is operable to carry out communications via a Wi-Fi network. For purposes of this description, a transceiver that is operable to carry out communications via a Wi-Fi network is referred to as a Wi-Fi transceiver.

In accordance with an embodiment in which DAQ device 104, vehicle scanner 106, and display device 108 each include a single wireless transceiver (e.g., a Bluetooth transceiver), one of the devices, such as display device 108, can operate as a master (e.g., a controller), and the other devices, such as DAQ device 104 and vehicle scanner 106, can operate as slaves to the master. DAQ device 104, vehicle scanner 106, and display device 108 may transmit communications via wireless network 110 using a time-division duplex arrangement and synchronized to a clock signal of the master.

Wireless transceiver 202 is not limited to a single wireless transceiver. For example, wireless transceiver 202 may comprise a Bluetooth transceiver and a Wi-Fi transceiver. In accordance with such an example, the Bluetooth transceiver may communicate with DAQ device 104 and/or vehicle scanner 106 via a Bluetooth network of wireless network 110, and the Wi-Fi transceiver may communicate with DAQ device 104 and/or vehicle scanner 106 via a Wi-Fi network of wireless network 110.

In accordance with an embodiment in which display device 108 includes two wireless transceivers (e.g., a Bluetooth transceiver and a Wi-Fi transceiver) and DAQ device 104 and vehicle scanner 106 each include two wireless transceivers (e.g., a Bluetooth transceiver and a Wi-Fi transceiver), DAQ device 104 and vehicle scanner 106 may simultaneously transmit data to display device 108 for display via display 300. In that regard, DAQ device 104 may transmit data to display device 108 via the Bluetooth network of wireless network 110 and vehicle scanner 106 may transmit data to display device 108 via the Wi-Fi network of wireless network 110. Alternatively, DAQ device 104 and vehicle scanner 106 may take turns transmitting data to display device 108 via the Bluetooth network, the Wi-Fi network, or both the Bluetooth network and the Wi-Fi network.

In accordance with an embodiment in which wireless transceiver 202 includes three or more wireless transceivers, two or more of the wireless transceivers may communicate according to a common air interface protocol or different air interface protocols.

Each wireless transceiver of the example embodiments may operate in a transceiver-on state. In the transceiver-on state, the transceiver is powered on. While operating in the transceiver-on state, the transceiver can transmit and receive data via an air interface. For some transceivers, while operating in the transceiver-on state, the transceiver can transmit and receive data via the air interface simultaneously. For other transceivers, at any given time while operating in the transceiver-on state, the transceiver can either transmit data or receive data via the air interface. Each wireless transceiver of the example embodiments may operate in a transceiver-off state. While operating in the transceiver-off state, the transceiver does not transmit or receive data via an air interface. While operating in the transceiver-off state, the transceiver can be powered off.

Wired interface 206 may include one or more ports. Examples of those ports include, but are not limited to, a Universal Serial Bus (USB) port, an audio output port, an audio input port, and a power port. Each port of wired interface 206 provides an interface to display device 108 and to one or more circuits. In one respect, the one or more circuits may comprise electrical circuits, such as the electrical circuits of a Universal Serial Bus (USB) cable or the electrical circuits of an Ethernet cable (e.g., a CAT 5 cable). In another respect, the one or more circuits may comprise optical fibers that are operable to carry optical signals. Other examples of the one or more circuits are also possible.

Processor 204 may comprise one or more general purpose processors (e.g., INTEL microprocessors) and/or one or more special purpose processors (e.g., digital signal processors). Processor 204 may execute computer-readable program instructions (CRPI) 212 that are contained in computer-readable data storage device 208.

Data storage device 208 may comprise a computer-readable storage medium readable by processor 204. The computer-readable storage medium may comprise volatile and/or non-volatile storage components, such as optical, magnetic, organic or other memory or disc storage, which can be integrated in whole or in part with processor 204. Data storage device 208 may contain various data including, but not limited to, CRPI 212, remote device data 214, menu data 216, and instruction data 218.

Remote device data 214 may include data associated with a device that is arranged to communicate with display device 108 via wireless network 110. For example, remote device data 214 may include data associated with DAQ 104, such as a radio identifier and password associated with DAQ 104. The data associated with DAQ 104 may be received at display device 108, for storing as remote device data 214, during a pairing process carried out between display device 108 and DAQ 104. The pairing process between DAQ 104 and display device 108 may include DAQ 104 providing display device 108 with the data associated with DAQ 104 and display device 108 providing DAQ 104 with data associated with display device 108. After carrying out the paring process with DAQ 104, display device 108 may use the remote device data 214 when establishing communication network 110 with DAQ 104.

Remote device data 214 is not limited to data associated with one remote device. In that regard, remote device data 214 may include respective data associated with each of a plurality of devices operable to communicate via wireless network 110, such as data associated with DAQ 104 and data associated with vehicle scanner 106. The data associated with vehicle scanner 106 may include a radio identifier and password associated with vehicle scanner 106. The data associated with vehicle scanner 106 may be received at display device 108, for storing as remote device data 214, during a pairing process carried out between display device 108 and vehicle scanner 106. The pairing process between vehicle scanner 106 and display device 108 may include vehicle scanner 106 providing display device 108 with the data associated with vehicle scanner 106 and display device 108 providing vehicle scanner 106 with data associated with display device 108. After carrying out the paring process with vehicle scanner 106, display device 108 may use the remote device data 214 when establishing wireless network 110 with vehicle scanner 106.

Menu data 216 comprises data that can be visually presented via display 300, such as a menu which may comprise one or more menu items that is/are selectable by a user. Selection of a menu item can cause display 300 to display instruction data 218. Additionally or alternatively, selection of a menu item can cause wireless transceiver 202 to transmit instruction data 218 to a remote device (e.g., DAQ 104 or vehicle scanner 106) as payload of a message, such as a data-share message or to transmit a mode-selection command to the remote device.

Instruction data 218 may comprise various data. As an example, instruction data 218 may comprise data that illustrates how to connect DAQ 104 and/or vehicle scanner 106 to device-under-service 102. As another example, instruction data 218 may comprise diagnostic information for diagnosing device-under-service 102. For instance, in accordance with an example embodiment in which device-under-service 102 comprises an automobile, the diagnostic information may comprise diagnostic flow charts for diagnosing an electrical system on the automobile. The diagnostic flow charts can provide different paths to follow based on measurement data display device 108 obtains from DAQ 104 and/or vehicle scanner 106.

CRPI 212 may comprise program instructions that are executable as an operating system that provides for direct control and management of hardware components (e.g., processor 204 and data storage device 208) of display device 108. The operating system can manage execution of other program instructions within CRPI 212. As an example, the operating system may comprise the Windows XP Embedded (XPe) operating system available from Microsoft Corporation, Redmond, Wash., United States. Other examples of the operating system are also possible. CRPI 212 may comprise program instructions that are executable by processor 204 to cause display 300 to display menu data 216 or instruction data 218. Displaying menu data 216 may include displaying a list of operating modes of DAQ 104 or of vehicle scanner 106.

Next, FIG. 3 illustrates a front view of an example embodiment of display device 108. FIG. 3 further illustrates that display device 108 includes display 300, a microphone 302 for receiving audible data (e.g., voice data generated by a user of display device 108 or sounds generated by a motor vehicle), a status indicator 304 (e.g., a light emitting diode (LED)), and user controls 306. The voice data may include voice commands for making a mode-selection from a menu displayed on display 300. A microphone symbol is located above microphone 302 and a data storage device symbol is located above status indicator 304.

Display 300 may comprise a liquid crystal display (LCD), a plasma display, or some other type of display. Display 300 is operable to visually present (e.g., display) data to a user. Display 300 may visually present data using numbers, letters, punctuation marks, pictures, graphs, or some other visually presentable form of data. The data visually presentable and/or presented at display 300 may include locally-acquired data (LAD), such as menu data 216 and a cursor that can be moved between menu items of menu data 216. The data visually presentable and/or presented at display 300 may include remotely-acquired data (RAD), such as data acquired via wireless transceiver 202 or wired interface 206.

Display 300 may comprise a touch screen that can detect the presence and location of a touch within its display area. The various menu items of a displayed menu may be selected via the touch screen.

User controls 306 are operable to enter a user-selection. User controls 306 may be arranged in various ways. In that regard, user controls 306 may be arranged to include a keypad, rotary switches, push buttons, or some other means to enter a user-selection. In the example embodiment illustrated in FIG. 3, user controls 306 include a power button 308, a brightness button 310, a keyboard button 312, a camera button 314, a cursor left button 316, a cursor right button 318, a cursor up button 320, a cursor down button 322, a menu item selection button 324, and a quick access button 326. Table 1 lists example user-selections that can be entered by pushing or pushing and releasing a user control of user controls 306. Other examples of user controls 306 and other examples of the user-selections are also possible.

TABLE 1

| User Control | Example User-selections |
|---|---|
| Power button 308 | Turn display device 108 power on or off. |
| Brightness button 310 | Increase or decrease a brightness of display 300. Display a brightness menu at display 300. |
| Keyboard button 312 | Display keyboard at display 300. Remove keyboard being displayed at display 300. |
| Camera button 314 | Activate camera shutter to capture an image |
| Cursor left button 316 | Move a cursor, displayed at display 300, to the left |
| Cursor right button 318 | Move a cursor, displayed at display 300, to the right |

TABLE 1-continued

| User Control | Example User-selections |
|---|---|
| Cursor up button 320 | Move a cursor, displayed at display 300, upward |
| Cursor down button 322 | Move a cursor, displayed at display 300, downward |
| Menu item selection button 324 | Select a menu item from displayed menu data 216. |
| Quick access button 326 | Select a function that pertains to a current operating mode of display device 108. |

As described above, the display 300 may be an interactive touch screen where a number of different actions can be selected by the user. The actions may be selected by touching the display 300 with a user's finger or with a stylus, for example. One such action may include selecting specific data related to the device-under-service 102 to be displayed.

Figure 4:
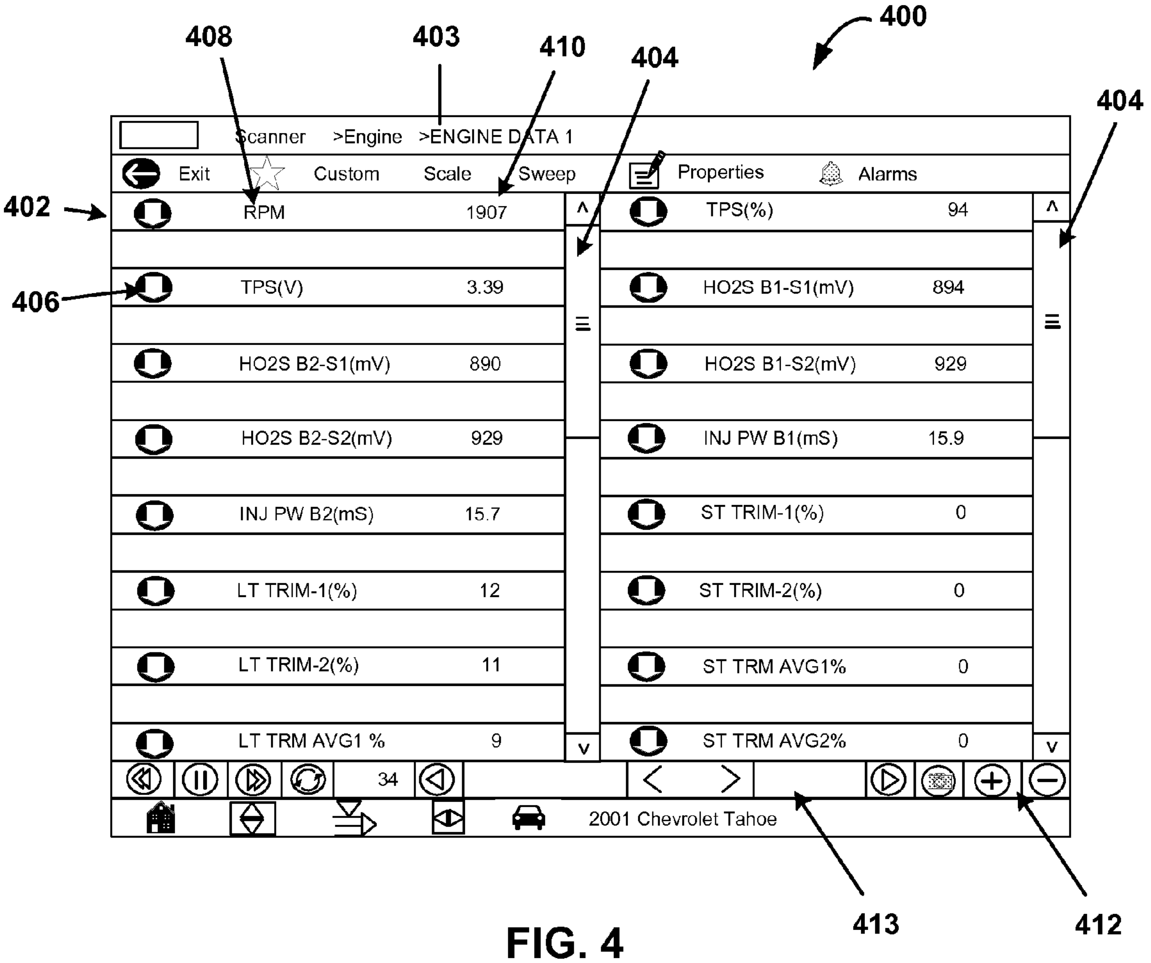
FIG. 4 is a front view of an example non-graph view display screen that may be shown on the display device of FIG. 3.

FIG. 4 illustrates an example data display screen 400 on a diagnostic tool, such as the display device 108, on which data being retrieved from the device-under-service 102 can be viewed. The data display screen 400 allows a user to select an individual parameter identifier (PID) to be displayed as text or as a graph, and to easily alternate between the text view and the graph view. The data display screen 400 shows a non-graph view of the retrieved data. For an embodiment in which device-under-service 102 is an automobile, such data may include, for example, engine data. The type of data shown may be selected by the technician, and may be displayed in a menu bar 403. The menu bar 403 may also include a list of options for viewing and formatting the data.

The data shown on the data display screen 400 may be arranged in a plurality of demarcated portions 402. The demarcated portions 402 may be presented in a dual column format, as shown in FIG. 4. Alternatively, other formats may be used. Each demarcated portion 402 may be rectangular in shape and may extend horizontally across one column of the display 300. Additional demarcated portions 402 may be viewed on the display 300 by scrolling up or down with scrollbars 404. In another embodiment, the non-graph view may not include scrollbars, and additional demarcated portions 402 may be viewed on the display 300 by touching and dragging the screen up or down with a finger or stylus.

Each of the plurality of demarcated portions 402 may include a graph selection element 406 located within or directly adjacent to the demarcated portion 402. In FIG. 4, the graph selection element 406 is shown as a virtual button on the display 300. However, it should be understood that the graph selection element 406 may comprise a physical button located on the display device 108. The graph selection element 406 enables parameter values associated with the graph selection element to be viewed as a graph in a single step. Therefore, a user does not have to perform multiple actions or visit a series of menus or prompts in order to alternate the viewing of information as a graph or as text.

The processor 204 may execute CRPI 212 to detect selection of graph selection element 406 (e.g., detecting a given area of display 300, where graph selection element 406 is located, is touched via a user's finger, a stylus, or some other selection device). In response to detecting selection of graph selection 406, processor 204 may execute CRPI 212 to cause display 300 to transition from a non-graph view to a graph view.

Each of the plurality of demarcated portions 402 may also include an associated PID 408 and current parameter value 410. The PID and parameter value both correspond to a single graph selection element 406. The PID 408 may be a parameter associated with the retrieved data (e.g., data received from vehicle scanner 106). In this example, the retrieved data is engine data for a vehicle (a 2001 Chevrolet Tahoe), and thus example PIDs may include Engine Revolutions per Minute (RPM), Throttle Position Sensor voltage (TPS), and Heated Oxygen Sensor voltage (HO2S). Other PIDs may include any OBD I or OBD II parameter. The PID 408 may take the form of an abbreviated parameter name. The current parameter value 410 is a current value of the PID with which the parameter value is associated. The current parameter value 410 is constantly changing and/or refreshing to display the current, up-to-date information associated with the specific PID of the device-under-service 102.

The non-graph screen 400 may also include one or more icons 412 for performing additional functions in the non-graph view, such as a zoom function, pausing and restarting the constant flow of data, taking a snapshot of the screen, and returning to the home screen, for example. These icons may be located toward the bottom of the display 300. A movie control or jog function 413 may also be located on the non-graph screen 400. The movie control function 413 may include a scroll bar which allows a user to fast forward or rewind the data received by the display device 108 and viewed on the display 300 in small or large increments.

Figure 5:
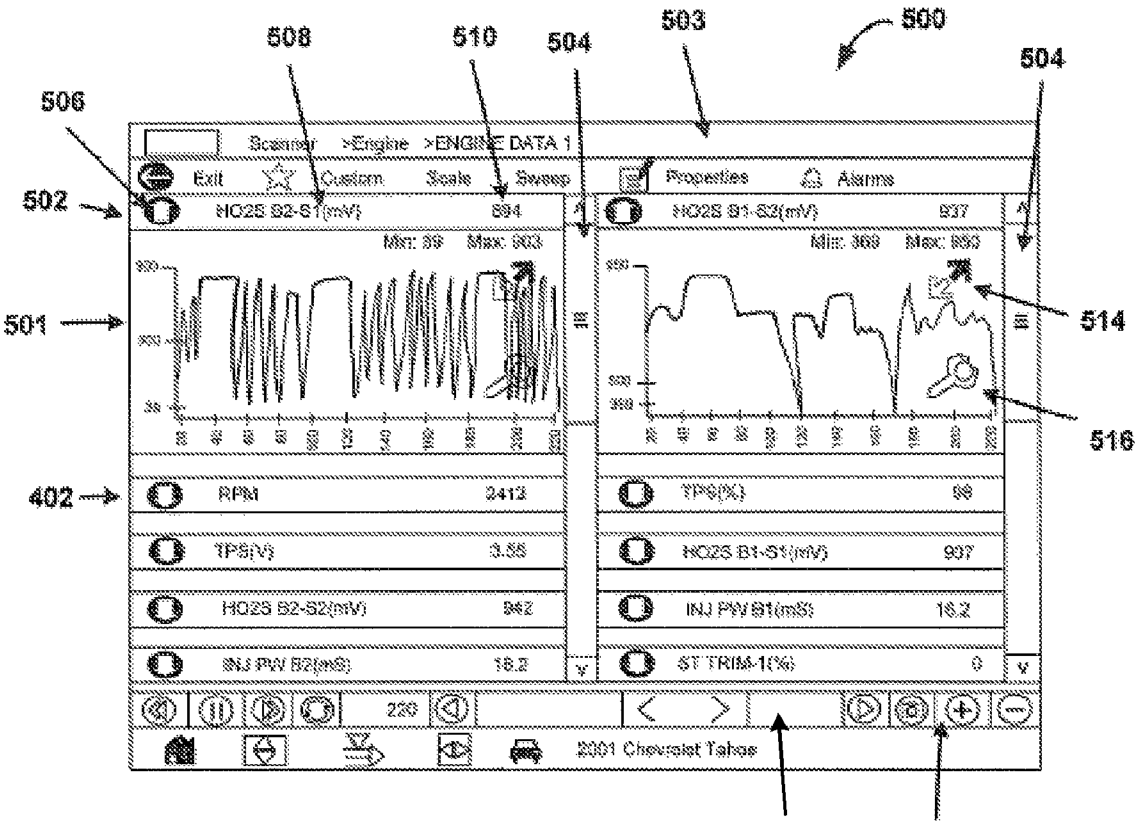
FIG. 5 is a front view of an example graph view display screen that may be shown on the display device of FIG. 3.

Referring to FIG. 5, the data retrieved from the device-under-service 102 can also be viewed in a graph view, as shown in data display screen 500. The graph view may include one or more graphs 501 of multiple parameter values 410 of certain PIDs 408. The graph view may also include a menu bar 503. In the graph view, the graphs 501 may include graph demarcated portions 502 located above the graph. Each graph demarcated portion 502 may include a text selection element 506, the same PID 408 that was associated with the selected graph selection element 406, and the current parameter value 510 of the PID. In the graph view, as in the non-graph view, the current parameter value 510 is constantly updating according to the most current data being retrieved from the device-under-service 102. All of the parameter values that have been retrieved are plotted to create the graph 501.

The text selection element 506 may be located within or directly adjacent to the graph demarcated portion 502. In FIG. 5, the graph selection element 506 is shown as a virtual button on the display 300. However, as with the graph selection element 406, text selection element 506 may comprise a physical button located on the display device 108. The text selection element 506 enables the PID and current parameter value associated with the text selection element to return to the non-graph view in a single step. Therefore, a user does not have to perform multiple actions or visit a series of menus or prompts in order to alternate the viewing of information as a graph or as text. The processor may execute CRPI that cause display 300 to transition from the graph view to the non-graph view.

Each graph 501 may be scrolling and constantly updating according to the current readings of the device-under-service 102. The newest current parameter value 510 is added to the right portion of the graph, and the oldest parameter value (at the left portion of the graph) is removed. The graph 501 may further include a display of the minimum and maximum parameter values retrieved from the device-under-service. These values may be displayed as "Min" and Max" on the graph 501.

More than one graph 501 can be viewed on the data display screen 500 at a time. For example, as shown in FIG. 5, two graphs 501 are shown on the data display screen 500. In one embodiment, up to four graphs are viewable on the data display screen 500. If more than four graphs are available for viewing on the display 300, additional graphs may be viewed by moving the scrollbars 504 or by touching and dragging the screen up or down with a finger or stylus. Other configurations are also possible.

The graph view 500 may also include one or more icons 512 for performing additional functions in the graph view, such as a zoom function, pausing and restarting the constant flow of data, taking a snapshot of the screen, and returning to the home screen, for example. These icons may be located toward the bottom of the display 300. A movie control or jog function 513 may also be located on the graph screen 500. The movie control function 513 may include a scroll bar which allows a user to fast forward or rewind the data received by the display device 108 and viewed on the display 300 in small or large increments.

The graphs 501 may include additional icons for specific graph functions, such as an expand/collapse icon 514 and a graph properties icon 516. When the graph 501 is displayed in only a portion of the data display screen 500, the expand/collapse icon 514 may be selected to expand the graph 501 to fill a larger portion of the screen or the entire screen 500. The processor 204 detects selection of the expand/collapse icon 514 and in response, CRPI are carried out which cause the graph 501 to expand. The expand/collapse icon 514 may then be selected again, causing the processor 204 to carry out a different set of CRPI which causes the screen to return to the standard view of the graph, where the graph is displayed in a smaller portion of the screen.

Figure 6:
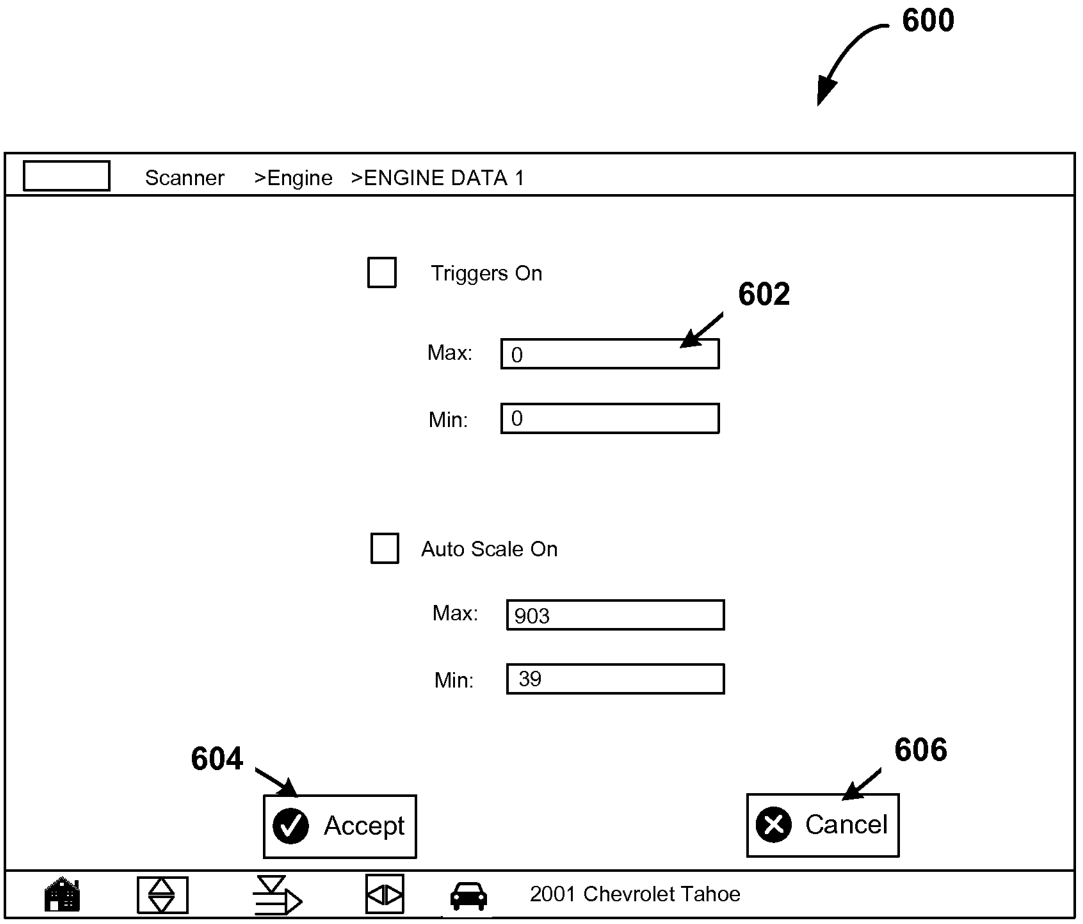
FIG. 6 is a front view of another display screen that may be shown on the display device of FIG. 3.

The graph properties icon 516 may allow a user to select triggers for recording a snapshot and to adjust the scale of the graph. When the graph properties icon 516 is selected, the processor 204 carries out CRPI which cause a screen 600 (shown in FIG. 6) to appear. Selecting one of the boxes 602 may open a virtual keyboard (not shown) on the display 300 to a user may enter information regarding the triggers or scale of the graph. The accept button 604 or cancel button 606 may then be selected by the user to return to the graph view of the data display screen 500.

In operation, a user selects one of the graph selection elements 406 in the non-graph view of the data display screen 400. Upon selection of a first graph selection element 406, a graph 501 of the information located in the demarcated portion 402 appears on the screen 400 in the graph view 500. Selection may include selecting the first graph selection element 406 on the display 300, or pressing a button on the display device 108 located next to the desired demarcated portion 402 which corresponds to the first graph selection element 406, for example. Selecting the first graph selection element 406 for the graph view moves the associated demarcated portion and graph 501 to the top of the plurality of graph demarcated portions 502. Some, or a portion of, the remaining demarcated portions 402 are viewable within the display 300 underneath the graph 501, and those demarcated portions which are not viewable in the display can be brought onto the display 300 by moving the scrollbars 504. In another embodiment, the graph view may not include scrollbars, and the remaining demarcated portions 402 or graphs may be viewed on the display 300 by touching and dragging the screen up or down with a finger or stylus.

As described above, more than one graph 501 can be viewed on the data display screen 500 at a time. To view an additional graph, a second graph selection element is selected by the user. If the second graph selection element is located in a different column than the graph 501, a second graph 520 appears at the top of the second column beside the first graph 501. If the second graph selection element is located in the same column as the graph 501, then the second graph 520 appears in the place of the graph 501 at the top of the column, and the graph 501 appears underneath the second graph 520. The latest selected graph appears at the top of its associated column.

When a large amount of graphs are viewable on the display 300 at once, such as four graphs, for example, the demarcated portions 402 may be only be visible by moving the scrollbars 504 or by touching and dragging the screen up or down with a user's finger or stylus. Additional graphs may also be viewable on the display 300 by moving the scrollbars 504 or by touching and dragging the screen up or down with a user's finger or stylus.

To return to the non-graph view, a user selects the text selection element 506 located in the graph demarcated portion 502 of the graph 501. Thus, as explained above, a user does not have to perform multiple actions in order to alternate the viewing of information as a graph or as text. This allows the user to be more efficient in their evaluation of the device-under-service 102.

While examples have been described in conjunction with present embodiments of the application, persons of skill in the art will appreciate that variations may be made without departure from the scope and spirit of the application. For example, the apparatus and methods described herein may be implemented in hardware, software, or a combination, such as a general purpose or dedicated processor running a software application through volatile or non-volatile memory. The true scope and spirit of the application is defined by the appended claims, which may be interpreted in light of the foregoing.

We claim:

1. A diagnostic tool for displaying data comprising:

a display having a non-graph view including a plurality of demarcated portions, each of the plurality of demarcated portions including a graph selection element, a parameter identifier that corresponds to the graph selection element, and a current parameter value that corresponds to the graph selection element; and a graph view provided in the display upon selection of the graph selection element in one of the demarcated portions, the graph view including a first parameter identifier and a first current parameter value each corresponding to the selected graph selection element, and the graph view further including a text selection element and a graph of multiple parameter values associated with the first parameter identifier wherein:

in the graph view, a portion of the plurality of demarcated portions are viewable within the display and a non-viewable portion of the plurality of demarcated portions are viewable via a scrollbar, the graph view further includes an expand/collapse selection element configured to (i) expand the graph to fill a larger portion of the display than a standard view of the graph upon a first selection of the expand/collapse selection element and (ii) collapse the graph to the standard view where the graph is displayed in a smaller portion of the display than an expanded view of the graph upon a second selection of the expand/collapse selection element, and the graph view further includes a graph properties icon configured to allow a user to select trigger conditions for recording a snapshot of the graph and to adjust scale of the graph, and selection of the graph properties icon causes a screen to be displayed on the display to allow a user to enter information regarding the trigger conditions and scale of the graph.

2. The diagnostic tool of claim 1 wherein upon selection of a second graph selection element corresponding to a second parameter identifier and a second current parameter value, a second graph of multiple parameter values associated with the second parameter identifier and the second current parameter value is displayed adjacent to the graph of multiple parameter values associated with the first parameter identifier.

3. The diagnostic tool of claim 1 wherein the graph of multiple parameter values includes the first current parameter value.

4. The diagnostic tool of claim 1 wherein the selection of the graph selection element occurs within a corresponding demarcated portion.

5. The diagnostic tool of claim 1 wherein the selection of the graph selection element occurs adjacent to a corresponding demarcated portion.

6. The diagnostic tool of claim 1 wherein the parameter identifier comprises an OBD II parameter.

7. The diagnostic tool of claim 1 wherein upon selection of the text selection element, the display returns to the non-graph view.

8. The diagnostic tool of claim 1 wherein the graph of multiple parameter values associated with the first parameter identifier includes a graph demarcated portion, and the text selection element is located in the graph demarcated portion.

9. The diagnostic tool of claim 1 wherein the graph of multiple parameter values associated with the first parameter identifier is located below the one of the demarcated portions.

10. The diagnostic tool of claim 1 wherein the data is vehicle data retrieved from a vehicle.

11. The diagnostic tool of claim 10 wherein the current parameter value is constantly updating according to the data being retrieved from the vehicle.

12. A diagnostic tool for displaying data comprising:

a display having a non-graph view including a plurality of demarcated portions, each of the plurality of demarcated portions including a graph selection element, a parameter identifier that corresponds to the graph selection element, and a current parameter value that corresponds to the graph selection element; and a graph view provided in the display upon selection of the graph selection element in one of the demarcated portions, the graph view including a first parameter identifier corresponding to the selected graph selection element and a first current parameter value corresponding to the selected graph selection element, and the graph view further including a text selection element located within the demarcated portion, and a graph of multiple parameter values associated with the first parameter identifier, wherein:

the text selection element is configured to return the display to the non-graph view, the graph view further includes an expand/collapse selection element configured to (i) expand the graph to fill a larger portion of the display than a standard view of the graph upon a first selection of the expand/collapse selection element and (ii) collapse the graph to the standard view where the graph is displayed in a smaller portion of the display than an expanded view of the graph upon a second selection of the expand/collapse selection element, and the graph view further includes a graph properties icon configured to allow a user to select trigger conditions for recording a snapshot of the graph and to adjust scale of the graph, and selection of the graph properties icon causes a screen to be displayed on the display to allow a user to enter information regarding the trigger conditions and scale of the graph.

13. The diagnostic tool of claim 12 wherein upon selection of a second graph selection element corresponding to a second parameter identifier and a second parameter value, a second graph of parameter values associated with the second parameter identifier and second current parameter value is displayed adjacent to the graph of parameter values associated with the first parameter identifier.

14. The diagnostic tool of claim 12 wherein the selection of the graph selection element occurs within a corresponding demarcated portion.

15. The diagnostic tool of claim 12 wherein the selection of the graph selection element occurs adjacent to a corresponding demarcated portion.

16. The diagnostic tool of claim 12 wherein the graph of multiple parameter values associated with the first parameter identifier includes a graph demarcated portion, and the text selection element is located in the graph demarcated portion.

17. The diagnostic tool of claim 12 wherein the data is vehicle data.

18. A method for displaying data on a diagnostic tool having a display comprising:

providing, in the display, a non-graph view having a plurality of demarcated portions, each of the plurality of demarcated portions including a graph selection element, a parameter identifier that corresponds to the graph selection element, and a current parameter value that corresponds to the graph selection element;

selecting the graph selection element in one of the demarcated portions to show a graph view in the display, wherein the graph view includes a first parameter identifier and a first current parameter value each corresponding to the selected graph selection element, and the graph view further including an expand/collapse selection element, a text selection element, a graph properties icon, and a graph of multiple parameter values associated with the first parameter identifier;

selecting the expand/collapse selection element to (i) expand the graph to fill a larger portion of the display than a standard view of the graph and (ii) collapse the graph to the standard view where the graph is displayed in a smaller portion of the display than an expanded view of the graph;

selecting the graph properties icon to allow a user to select trigger conditions for recording a snapshot of the graph and to adjust scale of the graph;

causing a screen to be displayed on the display upon selection of the graph properties icon to allow a user to enter information regarding the trigger conditions and scale of the graph; and selecting the text selection element to return to the non-graph view, wherein:

a first selection of the expand/collapse selection element expands the graph to fill the larger portion of the display than the standard view of the graph, and a second selection of the expand/collapse selection element collapses the graph to the standard view where the graph is displayed in a smaller portion of the display than the expanded view of the graph.

19. The method of claim 18 further comprising selecting a second graph selection element corresponding to a second parameter identifier and a second current parameter value before selecting the text selection element.

20. The diagnostic tool of claim 1, wherein the expand/collapse selection element is configured to expand the graph to fill an entire viewable portion of the display.

* * * * *